United States Patent
Hausberger et al.

(10) Patent No.: US 9,905,889 B2
(45) Date of Patent: Feb. 27, 2018

(54) HIGH VOLTAGE BATTERY SYSTEM FOR A VEHICLE

(71) Applicant: SAMSUNG SDI CO., LTD., Yongin-si, Gyeonggi-do (KR)

(72) Inventors: Ingo Hausberger, St. Andrä (AT); Roland Klobasa, Graz (AT); Markus Lettner, Wettmannstätten (AT); Michael Reiter, Berghausen (AT)

(73) Assignee: Samsung SDI Co., Ltd., Yongin-si (KR)

( * ) Notice: Subject to any disclaimer, the term of this patent is extended or adjusted under 35 U.S.C. 154(b) by 211 days.

(21) Appl. No.: 13/961,529

(22) Filed: Aug. 7, 2013

(65) Prior Publication Data

US 2014/0044998 A1    Feb. 13, 2014

(30) Foreign Application Priority Data

Aug. 13, 2012 (EP) .................................... 12180280

(51) Int. Cl.
 *H01M 10/42* (2006.01)
 *H01M 10/48* (2006.01)
(52) U.S. Cl.
 CPC ....... *H01M 10/425* (2013.01); *H01M 10/482* (2013.01)
(58) Field of Classification Search
 CPC .................................................. H01M 10/48
 See application file for complete search history.

(56) References Cited

U.S. PATENT DOCUMENTS

| 2002/0063002 | A1  | 5/2002  | Lasson  |              |
|---|---|---|---|---|
| 2003/0183191 | A1* | 10/2003 | Bertness | F02D 41/042 123/198 R |
| 2008/0050645 | A1* | 2/2008  | Kai     | B60L 11/1861 429/61 |
| 2008/0157721 | A1* | 7/2008  | Kaneko  | H02J 7/0014 320/136 |
| 2009/0191453 | A1* | 7/2009  | Fujii   | H01M 2/043 429/120 |
| 2009/0195217 | A1* | 8/2009  | Choi    | B60K 6/28 320/152 |
| 2009/0258282 | A1* | 10/2009 | Harada  | H01M 10/625 429/61 |
| 2010/0210318 | A1* | 8/2010  | Zhu     | H01M 10/4257 455/572 |
| 2011/0012606 | A1  | 1/2011  | Kawamura |             |

(Continued)

FOREIGN PATENT DOCUMENTS

| DE | 3626593 A1  | 2/1988 |
|---|---|---|
| DE | 60133613 T2 | 7/2009 |

(Continued)

OTHER PUBLICATIONS

EPO Extended Search Report dated Mar. 20, 2013, for corresponding European Patent Application No. 12180280.5 (7 pages).

*Primary Examiner* — Sarah A Slifka
*Assistant Examiner* — Brian Ohara
(74) *Attorney, Agent, or Firm* — Lewis Roca Rothgerber Christie LLP

(57) ABSTRACT

A high voltage battery for a motor vehicle and which includes cells and a system for controlling and monitoring the cells and the functioning of the battery system.

16 Claims, 2 Drawing Sheets

(56) References Cited

U.S. PATENT DOCUMENTS

2011/0054817 A1* 3/2011 Burgett .............. G01R 31/3651
702/63
2011/0282807 A1* 11/2011 Colello ................. G06Q 50/06
705/412

FOREIGN PATENT DOCUMENTS

| DE | 102008041518 A1 | 3/2010 |
| DE | 112008003519 T5 | 10/2010 |
| DE | 102010029461 A1 | 2/2011 |
| DE | 102010030353 A1 | 12/2011 |

* cited by examiner

HIGH VOLTAGE BATTERY SYSTEM FOR A VEHICLE

CROSS-REFERENCE TO RELATED APPLICATIONS

The present application claims priority 35 U.S.C. §119 to European Patent Application No. EP 121 80 280.5 (filed on Aug. 13, 2012), which is hereby incorporated by reference in its entirety.

TECHNICAL FIELD

Embodiments relate to a high voltage battery system for a motor vehicle, composed of cells and components for controlling and monitoring the cells and the functioning of the battery system. The cells are connected via high voltage lines and a high voltage interface to devices arranged outside the battery system, such as, in particular, a power converter. A metallically conductive screening plate, in particular, in the form of a housing, is assigned at least to the components and configured to control and monitor the functioning of the battery system. The lines of the high voltage interface which lead to the outside are led through common-mode interference dampers.

BACKGROUND

High voltage battery systems are composed of battery cells and a multiplicity of components. A battery system with Li-ion cells usually requires an electronic controller which monitors the cell voltage and the temperature, determines the operating voltage, the insulation resistance and the state of charge of the system and, if appropriate, controls disconnection devices. In the case of use in electrical or hybrid motor vehicles, the energy of the battery is transferred by a power converter to one or more electric machines, or vice versa (fed back). The power converter generates in this context a PWM alternating current (AC) from the direct current (DC) of the battery by way of power transistors.

As a result of the high-frequency control of the power transistors in the power converter, interference signals occur on the DC lines between the battery and the power converter. Such interference signals can also be generated by a charging device or a DC/DC converter which is connected to the high voltage bus. It is known to arrange such battery systems in a closed housing. This serves, on the one hand, to protect the battery components against external influences, and on the other hand to protect the surroundings from the voltage which is present inside the battery. The electronic control units are usually arranged inside the battery housing. Interference signals are also generated by the switching processes of these control units.

As described, the components of a battery are subjected to interference signals which are external to the battery as well as to interference signals which are internal to the battery. These interference signals can have a considerably adverse effect on the functional capability of the battery system. The high-frequency interference signal, which starts, for example, from a power converter, has a considerable adverse effect on, in particular, the sensing of the system voltage. Electronic units can also be damaged by particularly high voltage peaks.

DE 10 2008 041 518 A1 describes an accumulator monitoring system with a potential isolating circuit for connecting a data processing circuit and a sensing circuit.

DE 10 2010 029 461 A1 presents direct current source arrangements with coupling to a housing and using capacitors and EMI filters.

A device for controlling and monitoring direct voltage sources connected in series is presented in DE 10 2010 030 353 A1. Each direct voltage source is assigned a cell monitor. Galvanic decoupling of the cell monitor and central control unit is carried out by way of an isolation module.

DE 36 26 593 A1 discloses a device for accommodating a battery and electronics in a screening fashion. The electronics are accommodated in the battery housing.

DE 601 33 613 T2 describes the screening of a high voltage part, and DE 11 2008 003 519 T5 discloses the use of drilled cables in a bidirectional energy management system.

SUMMARY

Embodiments relate to a high voltage battery system having an enhanced design when compared to the known solutions.

In accordance with embodiments, a high voltage battery system for a motor vehicle includes at least one of: cells connected via high voltage lines and a high voltage interface to one or more devices arranged outside of the battery system (such as, for example, a power converter); components configured to control and monitor the cells and the functioning of the battery system; a housing having a metallically conductive screening plate which accommodates at least the components, wherein the lines of the high voltage interface which lead to the outside are led through common-mode interference dampers.

In accordance with embodiments, a high voltage battery system includes at least one of: cells which are connected in series or in parallel and which are coupled to components, which are arranged inside the battery system and configured to control and monitor the operation/functioning of the battery system, wherein the cells are connected via high voltage lines to one or more devices arranged outside the battery system (such as, for example, a power converter); a housing having a metallically conductive screening plate in which accommodates at least the components, wherein the high voltage lines which lead to the outside are led through common-mode interference dampers, and the high voltage interfaces are connected via capacitors to the housing.

In accordance with embodiments, a high voltage battery for a motor vehicle includes at least one of: a housing; a plurality of cells connected via high voltage lines and a high voltage interface to one or more devices arranged outside of the high voltage battery system; a system configured to control and monitor the status of the cells and; a metallically conductive compartment within the housing and configured to accommodate at least parts of the system, wherein lines of the high voltage interface which lead to outside of the high voltage battery system are led through common-mode interference dampers.

In accordance with embodiments, a high voltage battery system for a motor vehicle includes at least one of: a housing; a plurality of cells which are connected in series and which produce a high voltage connected to an output; a battery control unit having: (i.) battery modules arranged at each respective cell and configured to sense an operating state of the respective cell, (ii.) a first battery module controller; (iii.) a second battery module controller, wherein the first and second battery module controllers are connected via daisy chains to the sensors; and (iv.) a central unit which is galvanically isolated and operatively connected to the first battery module controller and the second battery module controller, and a metallically conductive housing part configured to accommodate the battery control unit.

In accordance with embodiments, a high voltage battery system for a motor vehicle includes at least one of: a housing; a plurality of cells configured to produce a high voltage and connected via high voltage lines and a high voltage interface to one or more devices arranged outside of the high voltage battery system; a battery control unit configured to control and monitor the status of the cells; a metallically conductive housing part configured to accommodate the battery control unit; and common-mode interference dampers configured to lead lines of the high voltage interface which to the one or more devices outside of the high voltage battery system.

In accordance with embodiments, an electronic unit includes a battery control unit configured to monitor the overall state of the battery system and control, for example, the equalization of charge between the battery cells. The battery control unit is arranged inside the battery housing and is covered by way of a dedicated screening plate, and is arranged in a dedicated metallically conductive housing part inside the battery housing.

In accordance with embodiments, a second electronic unit includes a battery module control unit configured to sense, in particular, the states such as the cell voltage of each individual battery cell and the temperature of at least individual battery cells, and passes on corresponding signals to the Battery Management Unit (BMU). The battery module control unit is connected via a screened line to the battery control unit, wherein the coupling to the battery control unit, which may occur via optocouplers or an inductive coupling, is galvanically disconnected.

In accordance with embodiments, both the battery control unit and the battery module control unit are screened and/or arranged in a disconnected housing inside the battery housing.

In accordance with embodiments, a current sensor inside the battery screen or the battery housing is connected via screened and/or twisted lines to the battery control unit.

The high voltage taps via which the battery control unit senses the voltage of the high voltage battery system are also of screened design.

In accordance with embodiments, disconnection devices for the high voltage interface and the pre-charging circuit are connected to the battery control unit via twisted lines and/or the specified components are activated and controlled by the battery control unit by way of lines which are twisted in such a way.

In accordance with embodiments, temperature sensors configured to sense the temperature at defined locations on the high voltage cells, and further sensors configured to sense the temperature of the cooling fluid, are also connected to the battery control unit via twisted lines.

In accordance with embodiments, additional battery module control units are connected to the battery module control unit in accordance with the daisy chain principle of a serial circuit. The connecting lines are twisted here and/or screened lines are used. In the case of screened lines, series capacitors are provided.

In accordance with embodiments, a capacitor is provided between the positive and the negative of the high voltage lines. In addition, arresting capacitors are used between the battery housing and the earth of the battery control unit.

DRAWINGS

Furthermore, an exemplary embodiment of the invention will be explained with reference to the drawings.

DESCRIPTION

Figure 1:
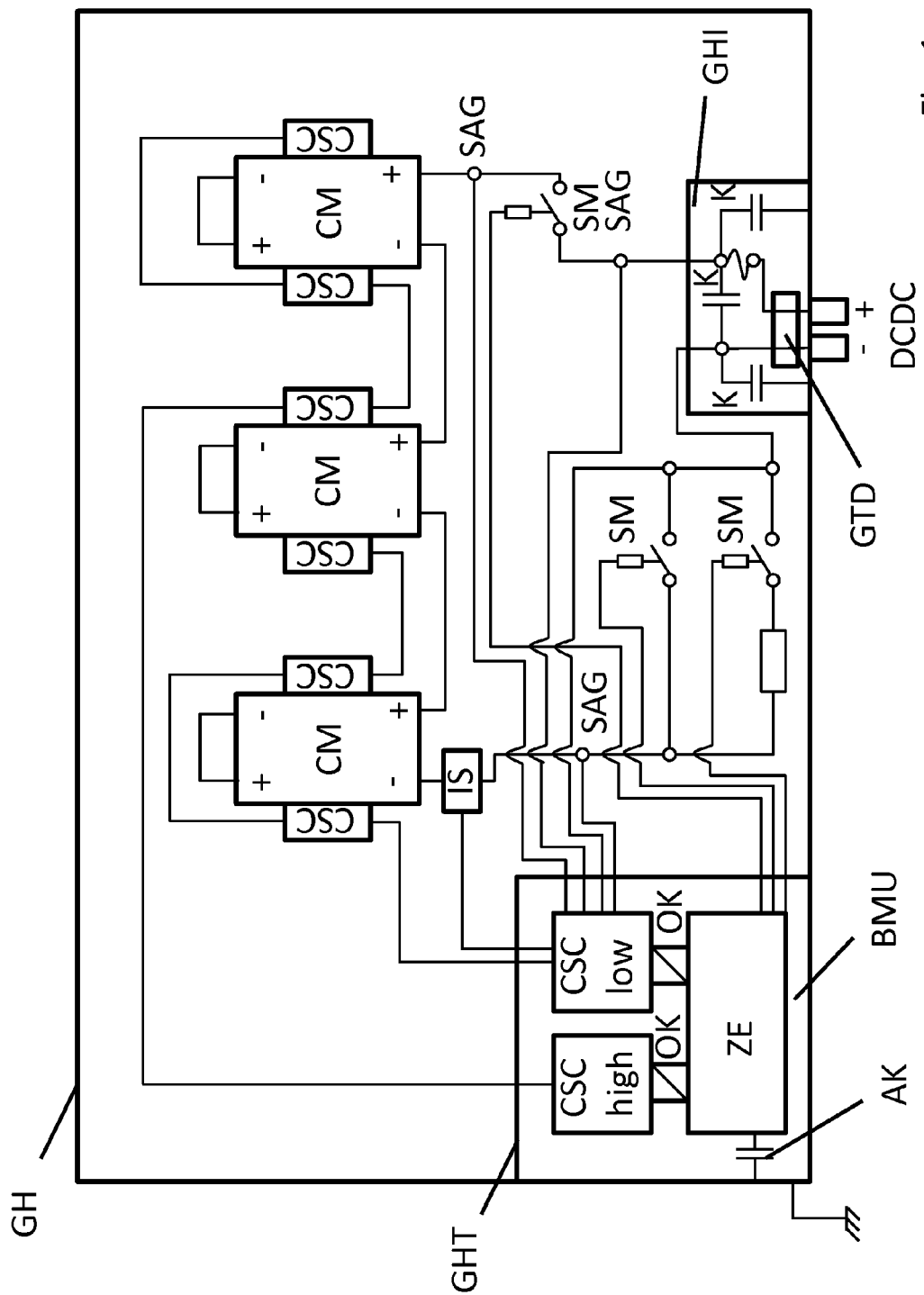
FIG. 1 illustrates a high voltage battery system for a motor vehicle, in accordance with embodiments.

As illustrated in the drawings, a high voltage battery system has a plurality of cells CM which are connected in series and provide the corresponding high voltage. This high voltage is connected to the output DCDC and is supplied, in particular, to a power converter (not illustrated). A central unit ZE of the battery control unit BMU is galvanically isolated and connected in particular via optocouplers OK (or by way of an inductive coupling) to a first battery module controller CSC bus low and a second battery module controller CSC bus high.

The battery module controllers CSC bus low and CSC bus high are connected via two daisy chains to CSC components arranged at the cells CM, modules CSC, via which different variables may be sensed, for example, the voltage and/or temperature of individual cells CM. A high signal rate can be achieved by way of the two daisy chains and the battery module controllers CSC bus low and CSC bus high.

The described battery control unit BMU is accommodated in a separate, screened housing part GHT within the housing GH of the high voltage battery system. An arresting capacitor AK is connected between the battery housing GH and the ground of the battery control unit BMU.

As illustrated in FIG. 1, a device having a shunt resistor is provided as the current sensor IS, which device is connected to the battery module controller CSC bus low. By virtue of the necessary galvanic isolation, the sensor line leads to the galvanically disconnected section of the BMU, the battery module controller CSC bus low. The connection of the current sensor IS to the battery module controller CSC bus low is made via a screened and/or twisted line system.

Figure 2:
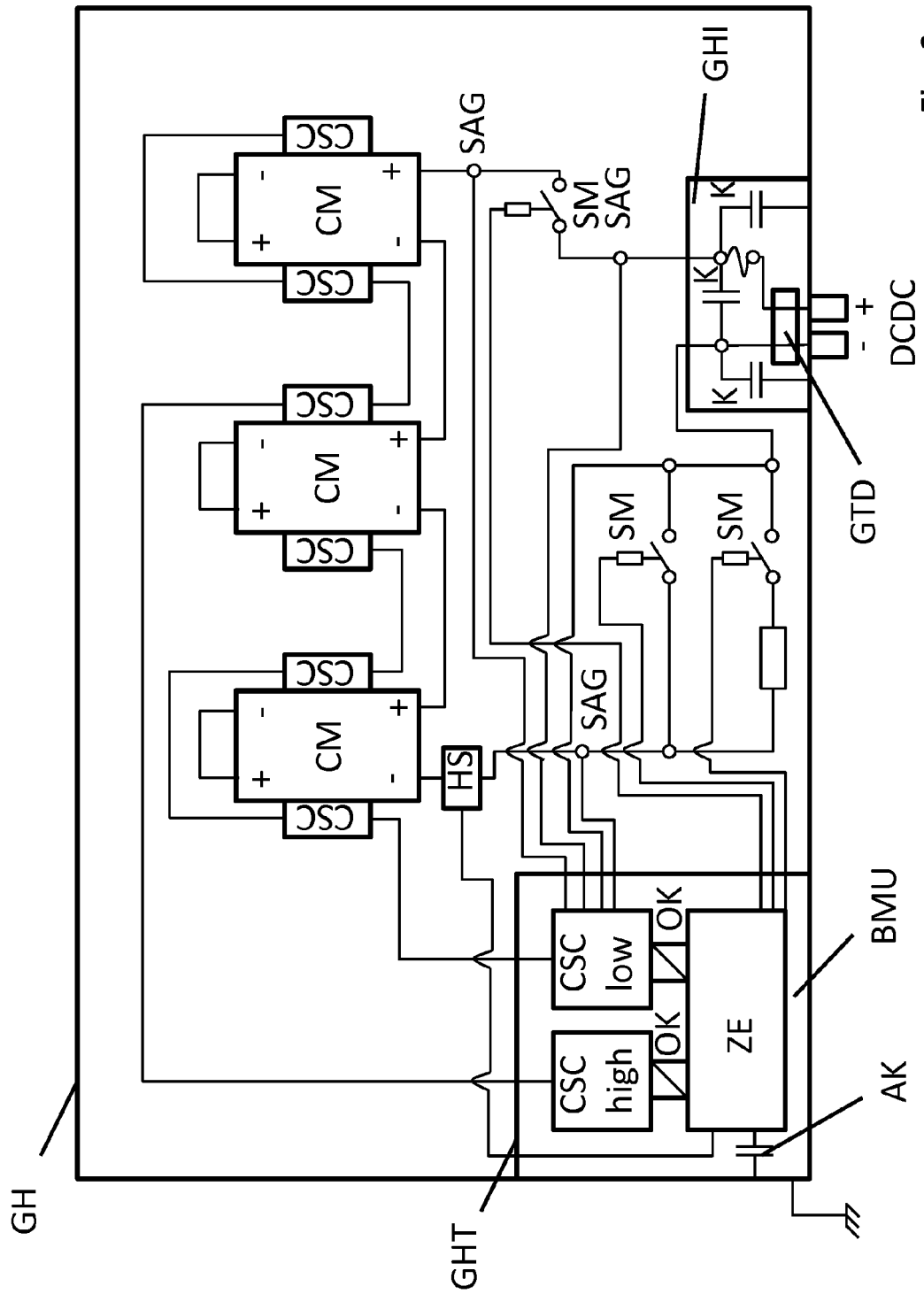
FIG. 2 illustrates a high voltage battery system for a motor vehicle, in accordance with embodiments.

As illustrated in FIG. 2, a device which has a Hall sensor is provided as the current sensor HS, which device is connected to the central unit ZE of the battery control unit BMU. Since no galvanic isolation is necessary any more by virtue of the magnetic measurement, the sensor line leads, in a screened and/or twisted form, directly to the central unit of the BMU. Basically, the sensing of current can also be carried out with a redundant system.

As illustrated in FIGS. 1 and 2, a plurality of switching mechanisms SM, via which the voltage of the cells ZE which are connected in series can be fed to the output DCDC, are provided in the load path. The switching mechanism SM may be activated via the central unit ZE of the battery control unit BMU and connected to said central unit ZE correspondingly by way of a screened and/or twisted line system.

Furthermore, in accordance with embodiments voltage taps SAG may be provided at three points on the load path. The voltage values of these taps SAG are connected to the battery module controller CSC bus low and are fed thereto via a screened and/or twisted line system.

The lines of the output DCDC are each led through ferrite rings (or VITROPERM® cores) as common-mode interference dampers GTD inside another battery housing part GHI and are led away to the ground of the high voltage battery system in conjunction with capacitors K. A capacitor K is also connected between the two high voltage lines.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

LIST OF REFERENCE SIGNS

DCDC output, interface for high voltage
BMU battery control unit
ZE central unit of the BMU
OK optocoupler, inductive coupling
CM high voltage cell
AK arresting capacitor
TS isolating switch
CSC device for sensing variables such as temperature, voltage
CSC bus high battery module controller
CSC bus low battery module controller
IS current sensor shunt
HS current sensor Hall
SAG voltage tap of high voltage line, load path
SM switching mechanism of high voltage line, load path
GTD common-mode interference damper, ferrite core, Vitroperm core
GH main housing of battery system
GHT housing part, screening
GHI housing part, screening
K capacitor

What is claimed is:

1. A high voltage battery for a motor vehicle, the high voltage battery comprising:
   a housing;
   a plurality of cells accommodated in the housing and connected via high voltage lines and a high voltage interface to one or more devices arranged outside of the housing, the high voltage interface comprising common-mode interference dampers;
   a system configured to control and monitor the operating status of the cells, the system comprising:
      a central unit;
      a first battery module controller; and
      a second battery module controller;
   a first electrically conductive compartment within the housing and accommodating the central unit, the first battery module controller, and the second battery module controller; and
   a second electrically conductive compartment within the housing, the second electrically conductive compartment accommodating the high voltage interface, the high voltage lines extending through the second electrically conductive compartment,
   wherein each of the first and second battery module controllers is connected to the central unit via an optocoupler, and
   wherein the cells are outside of the first and second electrically conductive compartments.

2. The high voltage battery of claim 1, further comprising a plurality of first capacitors,
   wherein ones of the first capacitors are connected in-line with ones of the high voltage lines of the high voltage interface and a ground of the high voltage battery.

3. The high voltage battery of claim 1, further comprising a second capacitor connected between ones of the high voltage lines of the high voltage interface.

4. The high voltage battery of claim 1, wherein the system further comprises a battery control unit.

5. The high voltage battery of claim 4, wherein the battery control unit comprises:
   a plurality of sensors, ones of the sensors being arranged at ones of the cells from among the plurality of cells and configured to sense an operating state of the respective cell,
   wherein the first and second battery module controllers are connected via daisy chains to the sensors.

6. The high voltage battery of claim 1, wherein the common-mode interference dampers comprise ferrite rings.

7. A high voltage battery system for a motor vehicle, the high voltage battery system comprising:
   a housing;
   a plurality of high voltage cells accommodated in the housing and connected via high voltage lines and a high voltage interface to an output, the high voltage interface comprising common-mode interference dampers;
   a battery control unit comprising:
      a plurality of first sensors, ones of the first sensors being arranged at ones of the cells from among the plurality of high voltage cells and configured to sense an operating state of the respective cell;
      a first battery module controller;
      a second battery module controller, the first and second battery module controllers being connected via daisy chains to the first sensors; and
      a central unit galvanically isolated and operatively connected to the first battery module controller and the second battery module controller; and
   a first electrically conductive sub-housing accommodating the central unit and the first and second battery control modules; and
   a second electrically conductive sub-housing within the housing, the high voltage interface being accommodated in the second electrically conductive sub-housing and the high voltage cells being outside of the second electrically conductive sub-housing,
   wherein each of the first and second battery module controllers is connected to the central unit via an optocoupler.

8. The high voltage battery system of claim 7, further comprising a second sensor configured to sense the current of a cell from among the plurality of high voltage cells.

9. The high voltage battery system of claim 8, wherein the second sensor comprises a shunt resistor which is connected to the second battery module controller via a screened and/or twisted line system.

10. The high voltage battery system of claim 8, wherein the second sensor comprises a Hall sensor which is connected to the central unit via a screened and/or twisted line system.

11. A high voltage battery system for a motor vehicle, the high voltage battery system comprising:
    a housing;
    a plurality of high voltage cells accommodated in the housing and connected via high voltage lines and a high voltage interface to one or more devices arranged outside of the housing, the high voltage interface comprising common-mode interference dampers;
    a battery control unit configured to control and monitor the status of the cells, the battery control unit comprising:

a central unit;
a first battery module controller; and
a second battery module controller;
a first electrically conductive housing part accommodating the battery control unit; and
a second electrically conductive housing part within the housing and accommodating the high voltage interface,
wherein the high voltage lines extend through common-mode interference dampers to the one or more devices outside of the housing,
wherein each of the first and second battery module controllers is connected to the central unit via an optocoupler, and
wherein the high voltage cells are outside of the first and second electrically conductive housing parts.

12. The high voltage battery system of claim 11, wherein the battery control unit further comprises:
a sensor for each respective cell from among the plurality of high voltage cells, each sensor being configured to sense an operating state of the respective cell; and
the central unit which is galvanically isolated and operatively connected to the first battery module controller and the second battery module controller.

13. The high voltage battery system of claim 12, wherein the first and second battery module controllers are connected via daisy chains to the sensors.

14. The high voltage battery system of claim 7, further comprising a second sensor configured to sense the current of the cells.

15. The high voltage battery system of claim 8, wherein the second sensor comprises one of:
a shunt resistor which is connected to the second battery module controller via a screened and/or twisted line system; or
a Hall sensor which is connected to the central unit via a screened and/or twisted line system.

16. The high voltage battery of claim 4, wherein a capacitor is connected between the housing and a ground of the battery control unit.

* * * * *